June 9, 1942. A. D. TRENOR Re. 22,111

CONTROL OF BROADCASTING BY KEYS

Original Filed Nov. 21, 1922 3 Sheets-Sheet 1

Inventor
Albert D. Trenor.
By his Attorney A. J. Gardner

June 9, 1942. A. D. TRENOR Re. 22,111
CONTROL OF BROADCASTING BY KEYS
Original Filed Nov. 21, 1922 3 Sheets-Sheet 2
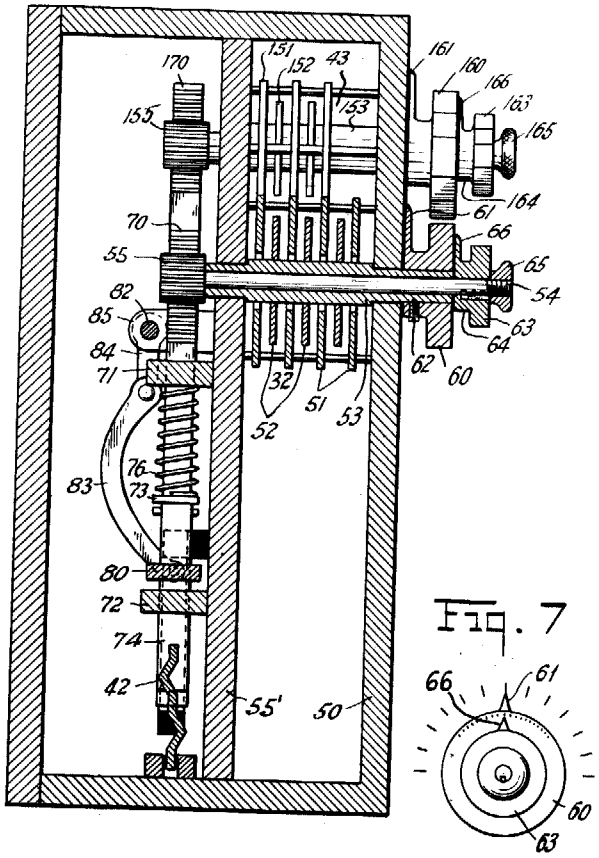
Fig. 3
Fig. 7
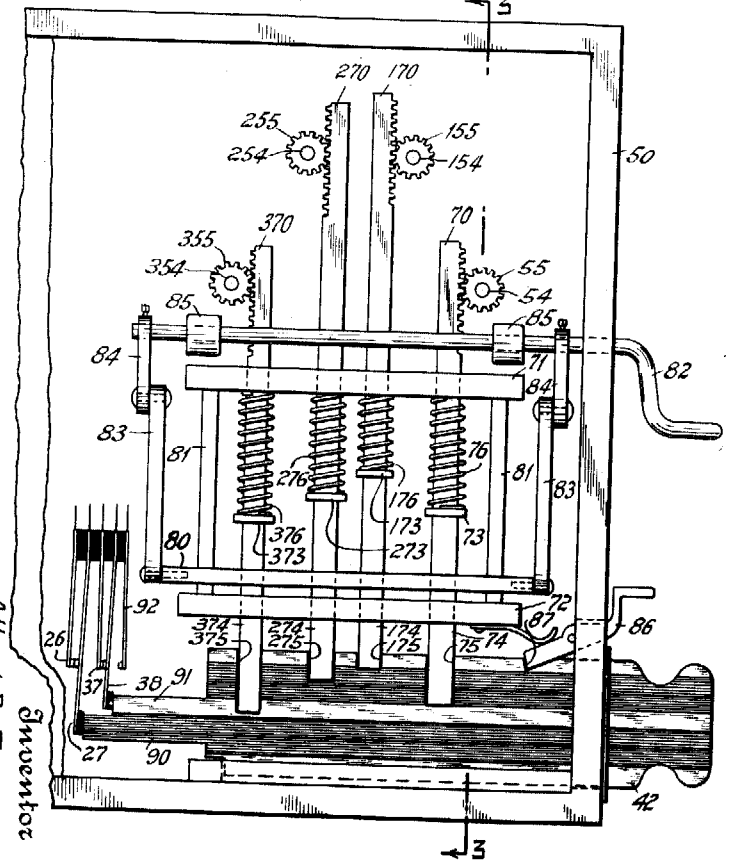
Fig. 2
Inventor
Albert D. Trenor.
By his Attorney A. D. Gardner June 9, 1942. A. D. TRENOR Re. 22,111

CONTROL OF BROADCASTING BY KEYS

Original Filed Nov. 21, 1922 3 Sheets-Sheet 3

Inventor
Albert D. Trenor.
By his Attorney A. J. Gardner

Reissued June 9, 1942 Re. 22,111

UNITED STATES PATENT OFFICE 22,111

CONTROL OF BROADCASTING BY KEYS

Albert D. Trenor, Gloucester, Mass., assignor, by mesne assignments, to Radio Corporation of America, New York, N. Y., a corporation of Delaware Original No. 1,712,181, dated May 7, 1929, Serial No. 602,373, November 21, 1922. Application for reissue March 10, 1931, Serial No. 521,518

20 Claims. (Cl. 250—40)

This invention relates to improvements in methods of and means for controlling the dissemination of information, music, etc., from broadcasting stations, and more particularly to the selective reception thereof.

Some of the objects of the present invention are to provide a receiving station selectively responsive to the energy emitted by a broadcasting station; to provide means for tuning the receiving station to desired frequencies; to provide means for automatically controlling the tuning means in accordance with varying combinations of frequency characteristics of the transmitted energy; to provide portable apparatus which may be used in combination with the receiving station to control the tuning thereof; to provide a plurality of devices operable together to determine principally the responsiveness of the receiving station; and to provide separable means for placing the devices in definite positions determined by the form of the particular separable means employed.

Other objects will appear from the following description taken in connection with the accompanying drawings and from the appended claims:

Fig. 2 is a rear view of the receiving station with the rear cover removed;

Fig. 3 is a section taken on the line 3—3 of Fig. 2;

Fig. 7 is a front view of the dials associated with the condenser.

The system of the present invention may include a secret system of communication of radiant energy of any desired form.

The sending station of the system transmits a carrier wave of relatively high frequency upon which there is impressed one or more series of amplitude variations having a relatively lower but supersonic frequency and modulated by voice or other signal currents. The signal currents may be of any desired character as, for example, broadcasted music, lectures, etc., such as are disseminated from so-called broadcasting stations. In time of war the signals may be of the nature of secret instructions intended to be received only by certain agents provided with special apparatus enabling them to adjust receiving stations therefor.

The receiving station of such a secret system may be described as comprising a plurality of resonant elements connected in series and tuned to the carrier frequency and to the frequency of the periodic variations respectively, so as to be selectively responsive to the energy received from the sending station with which the receiving station is arranged to co-operate and thereby enable the received energy to be transformed into sensible manifestations.

Figure 1:
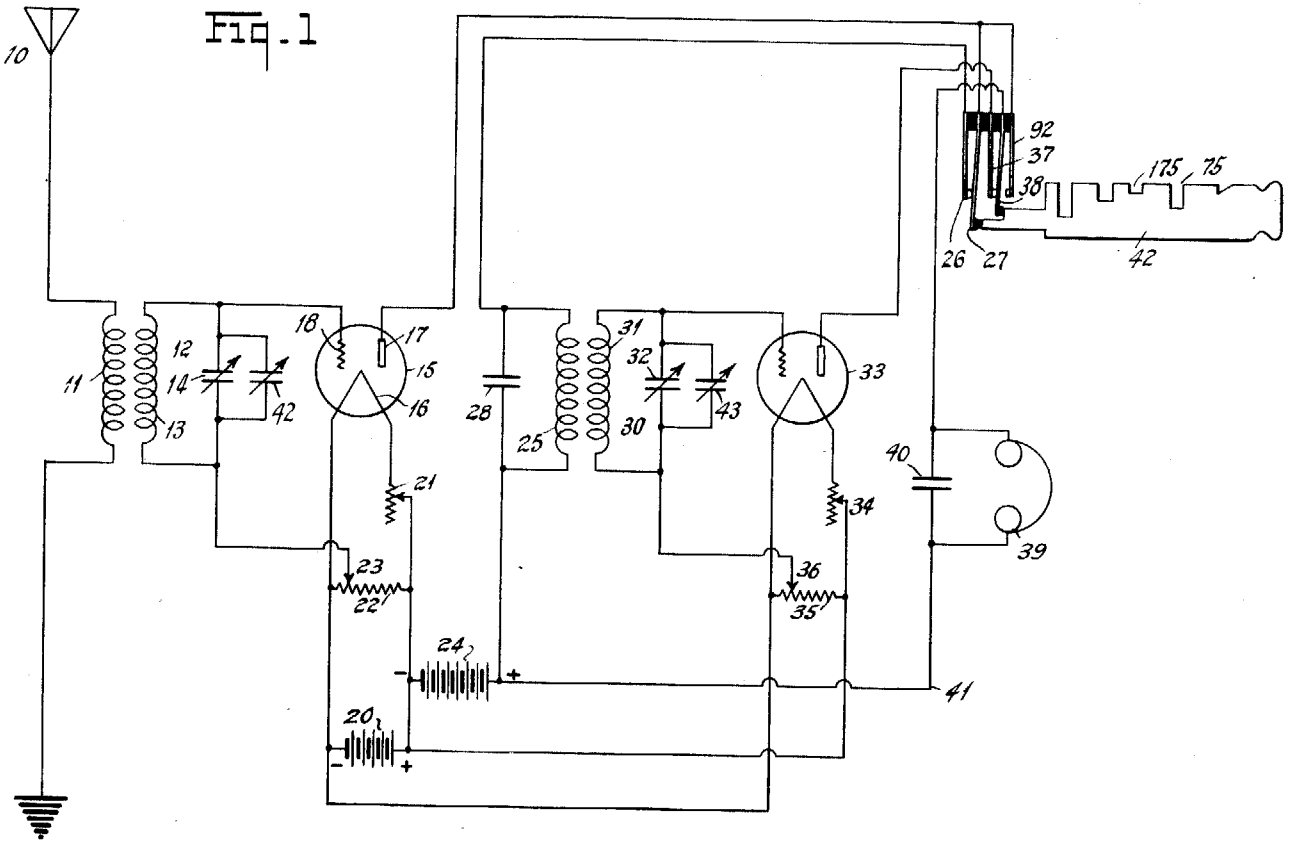
Fig. 1 is a diagram of the circuit connections of a receiving station embodying the invention.

Referring to the drawings, Fig. 1 illustrates one form of receiving apparatus embodying the present invention. As shown, there is provided a receiving element such as an antenna 10 positioned to intercept Hertzian waves. The circuit of the antenna 10 includes an inductance 11 coupled to a closed, oscillatory circuit 12. The closed, oscillatory circuit 12 comprises an inductance 13 and a variable condenser 14 and is tuned to resonance with the carrier frequency of the oscillations received by the antenna 10. The closed, oscillatory circuit 12 is operatively connected to the input of a detector which may take the form of a thermionic device 15 having a filament 16 for emitting electrons, a plate 17 upon which the electrons impinge and a grid 18 for controlling the passage of the electrons.

For heating the filament 16 of the thermionic device, there is provided a suitable filament battery 20. A rheostat 21 is connected in series with the filament 16 and the battery 20 to enable the intensity of the heating current to be controlled. In shunt with the battery 20 is a potentiometer 22 having a slider 23 connected to the closed, oscillatory circuit 12, whereby the normal potential of the grid 18 with respect to the filament may be adjusted. A high voltage battery 24 is connected in series with an inductance 25 and a pair of contact springs 26 and 27 to the plate 17 of the thermionic device 15, and thus the plate 17 is maintained at a positive potential with respect to the filament 16 of the device 15. A by-pass condenser 28 is provided in shunt with the inductance 25.

For tuning the receiving station to the frequency of the periodic variations impressed upon the emitted energy to which the station is intended to be responsive, there is provided a second, closed, oscillatory circuit 30 comprising an inductance 31 inductively coupled to the inductance 25 and a variable condenser 32. The closed, oscillatory circuit 30 is operatively connected to the input of a second detector which may take the form of a usual, three-electrode, thermionic device 33 having a filament, grid and plate. The filament of the device 33 may be heated by the same battery 20 which serves to supply current to the filament of the first-mentioned thermionic device 15, a suitable rheostat 34 being provided for controlling the strength of the current. In shunt with the battery 20, there is provided a potentiometer 35 having a slider 36 connected to the closed, oscillatory circuit 30 whereby the normal potential of the grid of the device 33 with respect to the filament thereof may be adjusted. The output circuit of the device 33 includes a pair of contact springs 37 and 38 in series, a suitable indicating device such as a telephone receiver 39 having a by-pass condenser 40 in shunt therewith, and a connection 41 extending to the positive terminal of the plate potential battery 24. The contacts 26, 27 and 37, 38 are constructed and arranged so as to be normally out of engagement with one another and to be brought into contact in pairs as shown in Fig. 1 by means of a separable member or key 42 for a purpose which will be subsequently set forth.

For making close or accurate adjustments of the receiving apparatus, there may be provided in parallel with the condenser 14 an auxiliary condenser 42 of smaller capacity and in parallel with the condenser 32 a second auxiliary condenser 43 of relatively small capacity.

The apparatus of Fig. 1 may be enclosed in compact form in a casing 50 (see Figs. 2 and 3) having mounted therein the inductances, condensers, thermionic devices and associated apparatus of Fig. 1. The indicating device 39 is connected with the remaining apparatus by means of a suitable, flexible cord so that it may be held in desired position apart from the casing. Such parts of the receiving station apparatus as are to be adjusted for the purpose of tuning may be arranged for adjustment by the rotation of suitable shafts associated therewith. While in the present embodiment, the condensers are shown adjustable for the sake of illustration, it is understood that the inductances or any other desired parts of the receiving station may be adjusted in a similar manner. These condensers may take any desired form, those shown in the present embodiment being of the usual sector type in which a plurality of semi-circular plates 51 are held in fixed position and a plurality of semi-circular plates 52 of somewhat smaller area are mounted on a rotatable sleeve 53 for movement between and in parallel with the stationary plates 51. By rotation of the shaft 53, the plates 52 may be moved so as to vary the area thereof intervening between the plates 51 and thus to vary the effective capacity of the condenser. The sleeve 53 is loosely mounted on a shaft 54 having on its inner end a pinion 55. The sleeve 53 is journalled in the casing 50 and a partition 55 therein.

For indicating the position of the sleeve 53 and the capacity of the condenser 32, there is provided a knob or handle 60 having a pointer 61 and affixed to the sleeve 53 outside of the casing 50 in any suitable manner, as by a screw 62. A second knob 63 is keyed to the shaft 54 and is provided with a shoulder 64 engaging a surface of the knob 60 and the end of the sleeve 53. The sleeve 53 and knob 60 may be adjustably positioned with respect to the shaft 54 and knob 63 and may be maintained in any desired position relative thereto by means of a lock nut 65 which may be operated to hold the knob 63 in intimate contact with the knob 60 and sleeve 53. The knob 63 is provided with a pointer 66 for indicating the relative adjustment of the shaft 54 and sleeve 53, and the pointer 61 may be arranged to co-operate with a series of calibrations marked on the front of the casing 50, as shown in Fig. 7, to indicate the position of adjustment of the condenser 32.

For operating the pinion 55 there is provided a longitudinally movable rack 70. The shaft of this rack moves through suitable bearings in parallel frame members 71 and 72. The rack shaft 70 terminates in a protruding end 74 arranged to engage a slot 75 in the key 42. A compression spring 76 mounted on the rack shaft 70 between the frame member 71 and a collar 73 rigidly secured to the rack shaft serves to maintain its end 74 securely seated in the slot 75 of the key 42.

Similarly, the other elements of the receiving station apparatus which are to be adjusted are actuated by racks 170, 270 and 370, the parts associated with these racks being designated by numerals having the same tens and units digits as are applied to the parts coacting with the shaft 70 and being operated in a similar manner.

For raising the rack shafts 70, 170, etc., in order to permit entry of the key 42, there is provided a perforated plate 80 slidably mounted on a pair of rods 81 and arranged to engage the collars 73, 173, etc., on the respective rack shafts. The plate 80 may be reciprocated by a crank 82 connected therewith by curved links 83 pivotally secured to arms 84 fast on the shaft of the crank 82. The shaft of the crank 82 is journalled in suitable bearing blocks 85 in a well known manner. A pawl 86 is pivotally mounted on the casing 50 and held in engagement with a notch 87 in the key 42 to maintain the key 42 in operative position independently of the ends 74, 174, etc., of the rack shafts.

For operating the contact springs 26, 27 and 37, 38, the key 42 is provided with an extension 90 having a shoulder 91. The extension 90 serves to throw the contact spring 27 into engagement with the contact spring 26, and the shoulder 91 co-operates with the contact spring 38 to throw it into engagement with the contact spring 37. In the normal position of the contact spring 38, when no key 42 is inserted, it engages contact spring 92. The key 42 is provided with slots corresponding in number to the number of racks and pinions to be operated, the depth of each slot determining the operative position of the corresponding rack and pinion. In the present disclosure, the two slots 75, 175 are used in combination for adjusting the same resonant circuit 30, the slot 75 determining roughly the capacity which is to be used and the slot 175 determining the capacity more precisely and thus more accurately tuning the circuit.

In the operation of the embodiment of the invention shown in Figures 1, 2 and 3, the sending station emits energy having a peculiar wave form to which the usual type of receiving station is not responsive. The receiving station shown diagrammatically in Fig. 1 may, however, be tuned thereto and such tuning may be accomplished in accordance with the present invention by the use of a portable, separable member such as the key 42 having slots 75, 175, etc., cut therein. The depths of the slots are determined by the wave characteristic of the energy emitted during a given performance, keys of unlike character being supplied for different performances. The crank 82 is turned to raise the racks, 70, 170, etc., and the racks are maintained in raised position while the key 42 is inserted until the detent 86 engages the notch 87. The insertion of the key actuates the contact springs 27 and 38 to open the circuit through the contact 92 and close the circuits through contacts 26 and 37 respectively. Upon release of the crank 82, the rack shafts 70, 170, etc., move downwardly under control of their retractile springs and enter the respective slots in the key 42. This downward movement causes rotation of the respective pinions, 55, 155, etc., the shafts 54, 154, etc., and the sleeves 53, 153, etc. clamped thereto. Rotation of these sleeves causes a change in the effective capacities of the respective condensers in the embodiment selected for illustration or in the inductance or other desired characteristic of other forms of apparatus which may be used for tuning.

The key may be released by rotating the crank 82 and operating the detent 86 and may then be withdrawn. The apparatus may be adjusted to compensate for wear, absorption of moisture or other effects by loosening the lock nut 65 and changing the position of the knob 63 with respect to the knob 60. Corrections may then be made in the setting of the apparatus as controlled by a given key combination.

When the key is inserted, the plate circuits of the thermionic devices 15 and 33 are closed by contact springs 26, 27 and 37, 38 respectively. The circuit of the battery 20 may also be closed in any desired manner, for example, by means of a suitable switch not shown. When no key is inserted, contact spring 38 engages spring 92 and causes the indicating device 39 to be actuated by thermionic device 15 directly.

Figure 4:
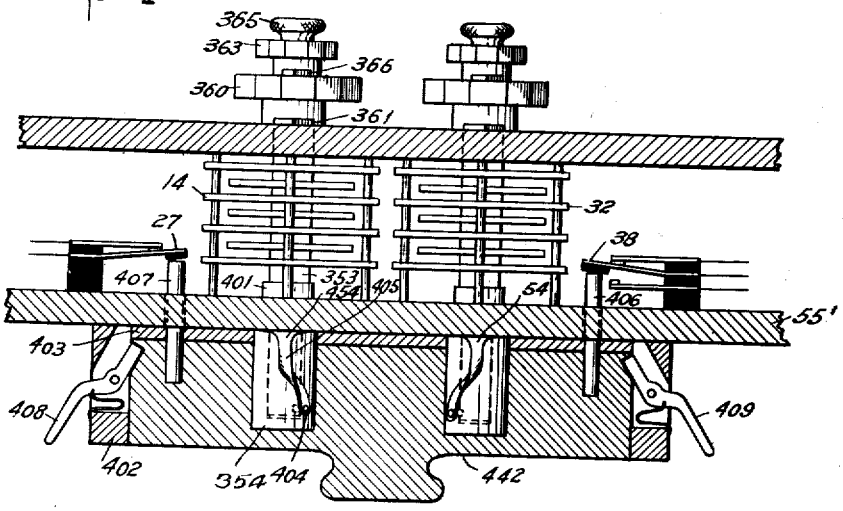
Fig. 4 is a top view partly in section of a modified form of the invention.
Figure 5:
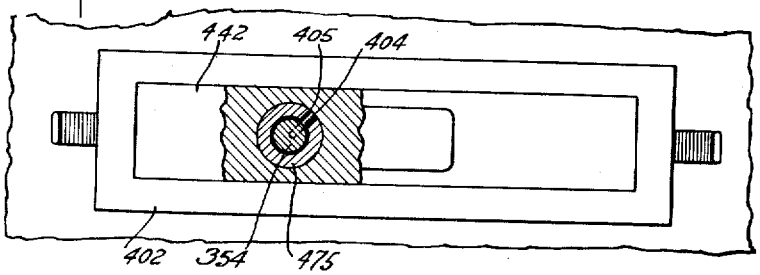
Fig. 5 is a rear view partly in section of the embodiment of the invention shown in Fig. 4.
Figure 6:
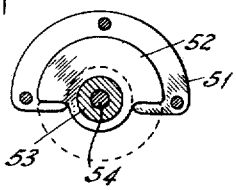
Fig. 6 is a view in transverse section of one of the condensers shown in Figs. 2 and 4.

The modified form of the invention shown in Figures 4 and 5 includes a pair of condensers 14 and 32 corresponding to similarly designated condensers of Fig. 1. The means for adjusting the condenser 14 will be hereinafter described, and it will be understood that, as shown in Fig. 4 of the drawings, similar means may be provided for adjusting the condenser 32. The movable plates of the condenser 14 are fixed to a rotatable sleeve 353 having a hub 401 of enlarged diameter adjacent to the partition 55'. An open receptacle 402, which, as shown, is rectangular in form, is secured to the partition 55' and serves as a socket for a separable member 442 of similar shape. The inner face of the member 442 is provided with a plurality of recesses in which are positioned a corresponding plurality of cylindrical members 475. The member 442 is preferably constructed of fragile material, such as porcelain or the like, and is provided with a face plate 403 of brass or other metal for maintaining the cylinders 475 in position. The operating shaft 454 of the condenser 14 has a pin 404 extending laterally therefrom, and the wall of the cylinder 475 is formed with a groove 405 to receive the pin. For obtaining different combinations of settings of the tuning elements of the receiving apparatus, the grooves 405 of different members 442 are cut in varying patterns. For example, the groove of a cylinder 475 may be cut straight inwardly or may be curved spirally in either direction. In the latter case, the direction of curvature, that is, to the right or to the left and the degree of curvature determine the setting of the apparatus associated with the shaft controlled by the cylinder. It will be seen that the separable member 442 is so constructed that inspection thereof will not indicate the combination for which it is intended, and since the member is made of fragile material any attempt to dis-assemble the same will result in its entire destruction.

For centering the separable control member 442 and for actuating the circuit controlling contact springs, there is provided a pair of pins 406 and 407 fixedly mounted on the member 442 and coacting with the springs 27 and 38 respectively. Detents 408 and 409 maintain the member 442 in locked position within the receptacle 402.

In the operation of the form of the invention illustrated in Figures 4 and 5, the separable member 442 is inserted in the receptacle 402 and locked therein by means of detents 408 and 409. The insertion of the separable member 442 in the receptacle 402 causes rotation of the shafts of the condensers 14 and 32 or other desired shafts into a predetermined combination of positions according to the depth and direction of rotation of the curves 405 of the cylinders 475, and thus the receiving apparatus is automatically tuned according to the key combination. When it is desired to remove the separable member 442, the detents 408 and 409 are depressed and the member may then be withdrawn.

The invention upon which this application is based is broader than the specific embodiments shown and described for the purpose of illustrating some of the ways in which it may be employed. The scope of the invention is therefore understood not to be limited by the present specific description. I intend no limitations other than those imposed by the appended claims.

What I claim is:

1. A receiving apparatus for radiant energy comprising a plurality of tuning means, devices for independently adjusting each of the tuning means and a key for determining the positions of said devices in accordance with the form of the key to tune the apparatus to energy desired to be received.

2. A receiving apparatus for radiant energy comprising tuning means, a plurality of devices for adjusting the tuning means and a separable member, having a different form in its various portions, for independently determining positions of said devices in accordance with its form at said various portions.

3. A receiving apparatus for radiant energy comprising tuning means, a plurality of rotatable shafts for adjusting the tuning means, and means for operating said shafts to tune the receiving apparatus to energy desired to be received, comprising a separable member having portions operable to control the positions of said shafts independently in accordance with the forms of said different portions.

4. A receiving apparatus for radiant energy comprising a casing, a plurality of tuning means, members mounted on the casing for to and fro movement and operatively connected with each of the tuning means, means for operating said members in one direction, and a key engaging said members for controlling movement of said members in the opposite direction to determine adjustments of the tuning means in accordance with the form of the key at the portions engaged by said members.

5. A receiving apparatus for radiant energy comprising tuning means, a plurality of members operatively connected with different elements of the tuning means, common means for moving said members in one direction, a key insertable in the paths of movement of said members and operable to limit the movements of said members in the opposite direction and thereby determine the adjustments of the tuning means in accordance with the form of the key at the portions engaged by said members.

6. A receiving apparatus for radiant energy comprising tuning means, a plurality of independently operable members operatively connected with the tuning means, means for yieldingly moving said members, manually operable means for moving the members in opposition to said yielding means, a key insertable in the paths of movement of said members and having indentations constructed to receive said members, so that the movements of said members under the action of said yielding means and, consequently, the adjustments of the tuning means are determined by the depths of the indentations in said key.

7. An apparatus for receiving radiant energy having a high carrier frequency and having periodic variations impressed thereon of a frequency lower than said carrier frequency but above good audibility, comprising circuits connected together in cascade relation, a detector interposed between said circuits and means for tuning said circuits respectively to said high frequency and the frequency of said periodic variations, said means comprising a control element, having a different form in its various portions, operable to determine the tuning of said respective circuits in accordance with its form at said various portions.

8. An apparatus for receiving radiant energy having a high carrier frequency and having periodic variations impressed thereon of a frequency lower than said carrier frequency but above good audibility, comprising circuits connected together in cascade relation, a detector interposed between said circuits, variable condensers included in said circuits respectively and means for adjusting said condensers to tune said circuits to said carrier frequency and said lower frequency respectively, comprising a key provided with indentations and means for setting the condensers in accordance with the depths of the indentations in the key.

9. An apparatus for receiving radiant energy having a high carrier frequency and having periodic variations impressed thereon of a frequency lower than said carrier frequency but above good audibility, comprising a detector, a resonant circuit connected with the input side of said detector and tuned to the carrier frequency, a second detector, a second resonant circuit interposed between said detectors and tuned to said lower frequency, an indicator, contacts arranged normally to close a circuit through the indicator and the output circuit of the first-mentioned detector, and means for connecting said detectors in cascade relation, including devices operable to cut said indicator out of the circuit of the first-mentioned detector and to connect the indicator in the output circuit of said second detector.

10. An apparatus for receiving radiant energy having a high carrier frequency and having periodic variations impressed thereon of a frequency lower than said carrier frequency but above good audibility, comprising a detector, a resonant circuit connected with the input side of said detector, a second detector, and a second resonant circuit interposed between said detectors, an indicator, contacts arranged normally to close a circuit through the indicator and the output circuit of the first-mentioned detector, means for connecting said detectors in cascade relation, including devices operable to cut said indicator out of the output circuit of the first-mentioned detector and to connect the indicator in the output circuit of said second detector, and means controlled by certain of said devices for tuning said resonant circuits respectively to said higher and lower frequencies.

11. An apparatus for receiving radiant energy having a high carrier frequency and having periodic variations impressed thereon of a frequency lower than said carrier frequency but above good audibility, comprising a detector, a resonant circuit connected with the input side of said detector, a second detector, and a second resonant circuit interposed between said detectors, an indicator, contacts arranged normally to close a circuit through the indicator and the output circuit of the first-mentioned detector, means for connecting said detectors in cascade relation, including a key operable to cut said indicator out of the circuit of the first-mentioned detector and to connect the indicator with the output circuit of the second detector, and means controlled by said key for tuning said resonant circuits respectively to said higher and lower frequencies.

12. Apparatus for receiving the energy of a wave modulated at a substantially constant frequency lower than the wave frequency, comprising a plurality of tuning elements and means for tuning said elements to the respective frequency characteristics of the wave without knowledge by the operator of said frequency characteristics, said means comprising a separable control element comprising portions formed to independently set each of the tuning elements so as to be in resonance with the respective frequency characteristics of the wave.

13. A receiving apparatus for radiant energy comprising a variable condenser including a rotatable shaft, a sleeve mounted on the shaft, plates carried by the sleeve, means for securing the sleeve to the shaft in various positions relatively thereto comprising a member keyed to the shaft at one end of the sleeve and a nut threaded on the shaft, and means for rotating the shaft to adjust the condenser.

14. A receiving apparatus for radiant energy comprising a variable condenser including a rotatable shaft, a sleeve mounted on the shaft, plates carried by the sleeve, devices for securing the sleeve to the shaft in various positions relatively thereto, indicators mounted for movements with said sleeve and with said shaft relatively to the sleeve respectively, and a separable member, having a different form in its various portions, for controlling the rotation of the shaft and consequent adjustment of the condenser in accordance with the form of said separable member at its various portions.

15. In a radio station finder, in combination with a plurality of tuning instruments of a receiving set, a pinion upon the shaft of each of said instruments, vertical spring actuated racks in engagement with each of said pinions, and a single key member for limiting the relative longitudinal movements of said racks.

16. The combination, with an adjustable tuning element of a radio receiving system, of a plurality of selectively operable means each acting upon operation to effect the movement of said element to a predetermined position.

17. The combination, with an adjustable tuning element of a radio receiving system, of a plurality of selectively operable means acting upon selective operation thereof to effect the movement of said element to respectively different positions.

18. In a radio receiver, a tuning element including means whereby it may be adjusted to a plurality of predetermined tuning positions, and a plurality of devices each for actuating said means to adjust said element to a different one of said positions.

19. In a radio receiver, a tuning element including means whereby it may be adjusted to a plurality of predetermined tuning positions, and a plurality of key members each for actuating said means to adjust said tuning element to a different one of said positions.

20. In a radio receiver, a tuning element having means whereby it may be adjusted to a plurality of predetermined tuning positions, and a plurality of portable devices each for actuating said means to adjust said tuning element to a different one of said positions.

ALBERT D. TRENOR.